(12) United States Patent
Marczynski et al.

(10) Patent No.: US 6,595,597 B2
(45) Date of Patent: Jul. 22, 2003

(54) COMBINED DUST CAP AND POSITION INDICATING DEVICE, PARTICULARLY FOR VEHICLE WHEEL NUTS

(75) Inventors: Michael Marczynski, Manchester (GB); John Marriott, Somerset (GB)

(73) Assignee: Business Lines Limited, Manchester (GB)

( * ) Notice: Subject to any disclaimer, the term of this patent is extended or adjusted under 35 U.S.C. 154(b) by 0 days.

(21) Appl. No.: 10/092,500

(22) Filed: Mar. 8, 2002

(65) Prior Publication Data
US 2002/0089231 A1 Jul. 11, 2002

Related U.S. Application Data

(62) Division of application No. 09/365,804, filed on Aug. 3, 1999, now Pat. No. 6,398,312.

(30) Foreign Application Priority Data

Apr. 24, 1998 (GB) ................................. 9808699

(51) Int. Cl.⁷ .............................. B60B 1/00; B60B 7/14; G01L 5/00; F16B 31/02; F16B 37/14
(52) U.S. Cl. ............................ 301/37.374; 301/35.622; 73/761; 116/212; 414/14; 414/431
(58) Field of Search .......................... 73/761; 116/212; 414/14, 431, 916, 917; 301/35.621, 35.622, 35.623, 35.625, 37.374 I

(56) References Cited

U.S. PATENT DOCUMENTS

| | | |
|---|---|---|
| 2,421,176 A | 5/1947 | Adams |
| 4,930,951 A | 6/1990 | Gilliam |
| 5,096,263 A | 3/1992 | Wright |
| 5,120,174 A | 6/1992 | Patti |
| 5,181,767 A | 1/1993 | Hudgins et al. |
| 5,199,835 A | 4/1993 | Turner |
| 5,380,070 A | 1/1995 | FitzGerald |
| 5,590,992 A | 1/1997 | Russell |
| 6,053,681 A * | 4/2000 | Mattershead ................ 411/195 |
| 6,158,933 A | 12/2000 | Nicholson |
| 6,398,312 B1 * | 6/2002 | Marczynski et al. ... 301/35.622 |

FOREIGN PATENT DOCUMENTS

GB  2 242 720 A  10/1991

* cited by examiner

Primary Examiner—S. Joseph Morano
Assistant Examiner—Jason R. Bellinger
(74) Attorney, Agent, or Firm—Oliff & Berridge, PLC

(57) ABSTRACT

For indicating relative rotational displacement between a fixed first member, such as a stud (20) on a wheel hub, and a second member, such as a wheel nut (22), which is rotatably engaged with the first member, a safety device (24) comprises a body (26) having a bore formed with equispaced grooves enabling the device to be releasably secured to the second member (22) in one position of a plurality of positions and having indicating means, such as a pointer (28), to indicate the position of the device (24) relative to a reference, such as a mark (32) on the rim (16) covering the wheel hub (14). The bore within the body (26) is closed at one end, e.g. by bevelled top wall (36), so that the body additionally serves as a dust cap for the conjoined first and second members (20, 22).

14 Claims, 4 Drawing Sheets

HALF SECTION 'A'

COMBINED DUST CAP AND POSITION INDICATING DEVICE, PARTICULARLY FOR VEHICLE WHEEL NUTS

This is a divisional of application Ser. No. 09/365,804 filed Aug. 3, 1999, now U.S. Pat. No. 6,398,312 B1.

This invention concerns a combined dust cap and position indicating device, particularly but not exclusively for use upon vehicle wheel nuts.

The applicants' earlier patent, GB 2 242 720, discloses a simple device enabling visual inspection to be carried out so as to indicate whether or not a wheel nut has become loose or is starting to become loose.

In general terms, the earlier invention provided a safety device for indicating relative rotational displacement between a fixed first member and a second member which is rotatably engaged with the first member, the device comprising a body having a bore formed with equispaced grooves enabling the device to be releasably secured to the second member in one position of a plurality of positions, and having indicating means, such as a pointer, to indicate the position of the device relative to a reference.

As mentioned, such a device is particularly useful for indicating whether or not a wheel nut has become loose, in which respect the first member comprises a threaded stud on an axle hub, the second member comprises a wheel nut, and the reference comprises a mark on a wheel rim adjacent a respective stud hole.

The present invention is a useful development of the previous safety device, as defined above, and is characterised in that in such a device the bore is closed at one end so that the body additionally serves as a dust cap for conjoined first and second members.

The indicating means can comprise a pointer and the body and the pointer can be formed either integrally or as separate components.

The bore in the body can be closed by a removable cap and the pointer can be formed either integrally with the cap or the body or as a separate component which is securable to the body.

The present invention further comprises a vehicle wheel and hub assembly comprising studs on the hub and associated nuts securing the vehicle wheel to the hub, a safety device as defined in the preceding paragraphs being arranged on each nut when tightened, so that each device points to a reference.

The present invention will now be more particularly described with reference to the accompanying drawings in which, FIG. 1 is a side elevation of a vehicle wheel which has been fitted with a number of safety devices according to the present invention;

Figure 1:
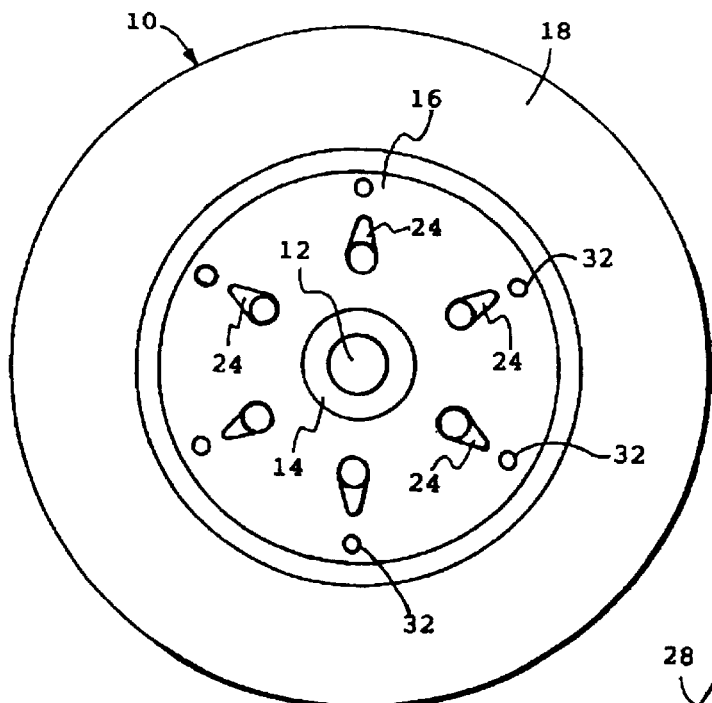

Referring to FIG. 1 there is shown a vehicle wheel assembly (10) comprising an axle (12), a hub (14), and a rim (16) on which a tire (18) is mounted. The hub (14) has six threaded studs (20) which through openings in the rim (16), and the rim (16) is secured to the hub (14) by nuts (22). A safety indicating device (24) is attached to each nut (22). In this respect, each safety device (24) fits over and completely covers its respective nut (22) and the end of the stud (20) on which it is threadably engaged, so the latter are not visible in FIG. 1, but can be seen in detail in FIG. 3.

Figure 2:
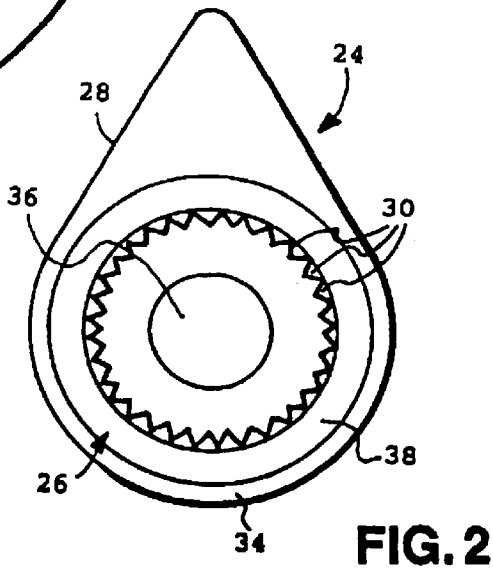
FIG. 2 is a underside plan view of a first practical embodiment of a safety device of the present invention.
Figure 3:
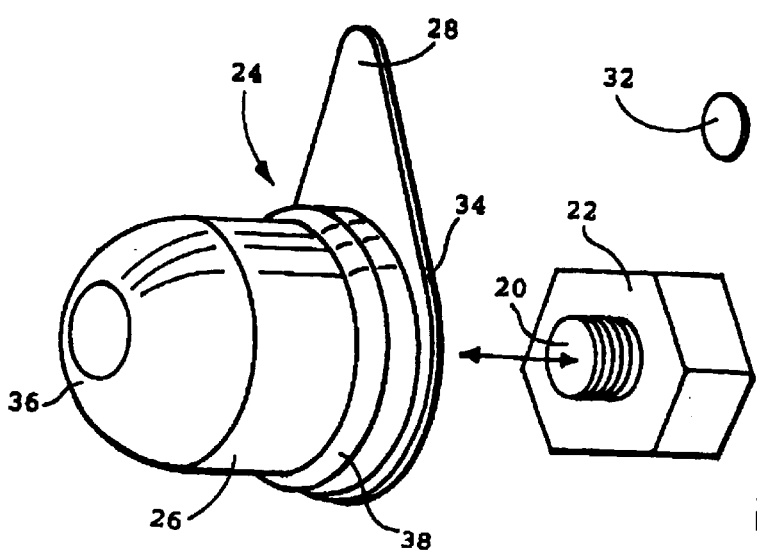
FIG. 3 is a perspective view, to a slightly reduced scale, showing the device illustrated in FIG. 2 being fitted over a wheel nut.

As shown in more detail in FIGS. 2 and 3, the device (24) comprises a circular body (26) though it can be hexagonal in section, having a pointer (28). The body (26) has a central bore which is provided with a number of equispaced grooves or splines (30) enabling the device (24) to be secured to the nut (22) by engagement between the corners of the nut and respective ones of the grooves or splines (30).

The bore of the body (26) is closed at one end by a rounded or bevelled top wall (36) so that the body as a whole serves as a dust cap for the threaded connection between the wheel nut (22) and the stud (20). The body (26) also has a flared region (38) adjacent the open end of the bore. The splines (30) do not extend to this flared region. Taken together, the provision of the top wall (36) and the flared region (38) substantially prevent dust and dirt clogging the connection between the wheel nut (22) and stud (20) which is covered by the body (26). This means the connection between the nut (22) and the stud is less prone to jamming or corrosion than a similar connection which is not provided with a dust cap.

The body (26) also has an outwardly raised rim (34) at the open end of the bore and the pointer (28) is formed as an extension of this rim (34).

The body (26) is suitably produced from plastics, in one piece, by moulding. In this respect, the flared region (38) will assist release of the body from the mould.

The body may advantageously be produced from fluorescent plastics material, or the material of the body (26) (or at least the pointer (28)) may have a fluorescent coating applied to enhance its ready visibility.

Corresponding to each device (24), a reference in the form of a mark (32) is provided on the rim (16). The mark (32) can be painted onto the rim or stuck to the rim, and the mark can be fluorescent.

The bore in the body (26) and the splines (30) are sized so that the device (24) is a force fit on each nut (22) so that the device (24) will not become loose during use but can be released from the nut when necessary.

In order to use the device as illustrated in FIG. 1, the rim (16) and therefore the tire 18 is attached to the hub (14) in the usual way and all of the nuts (22) are tightened to the necessary degree of tightness. A device (24) is then attached to each wheel nut (22) so that each pointer (28) points to its respective reference mark (32).

The corresponding components of the safety devices shown in FIGS. 4 to 9 inclusive have been given identical references to those shown in FIGS. 1 to 3.

Figure 4:
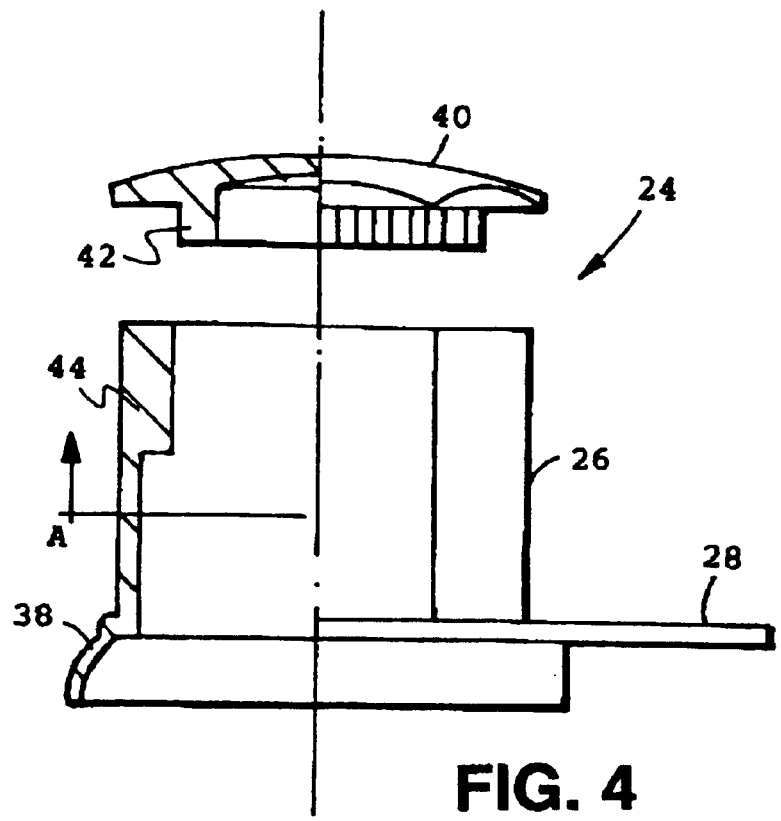
FIG. 4 shows a part sectional elevation of a modified form of safety device to that shown in FIGS. 2 and 3.
Figure 5:
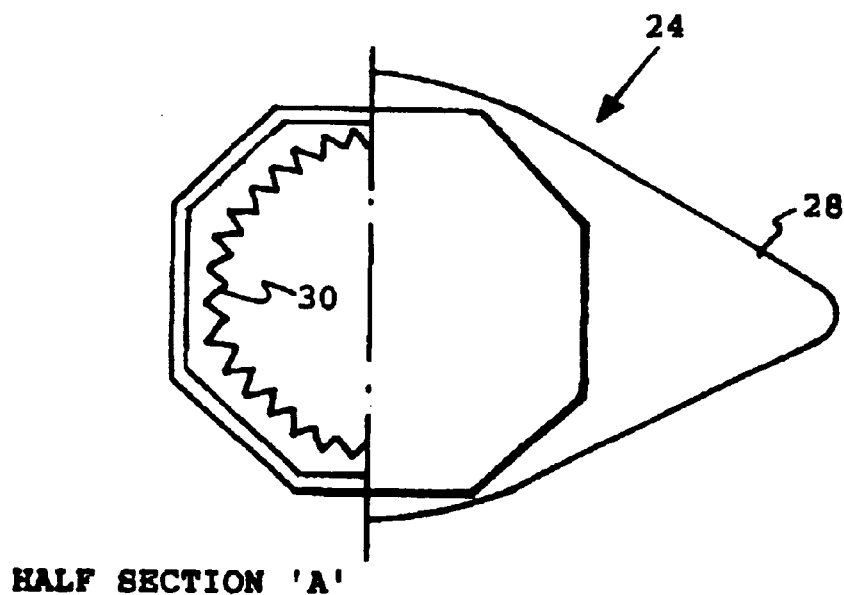
FIG. 5 shows a part sectional underside view of the safety device shown in FIG. 4.

Referring particularly to FIGS. 4 and 5 the safety device (24) shown in these figures comprises a body (26) having a central bore which is provided with a number of equi-spaced grooves or splines (30) enabling the device (24) to be secured to the nut (22) (FIG. 3) by engagement between the corners of the nut and respective ones of the grooves or splines (30).

The body (26) has an hexagonal external shape and is provided with a pointer (28).

The bore of the body (26) is closed at one end by a removable cap (40). The cap (40) is provided with teeth or splines (42) which engage with teeth or splines (44) formed in the bore of the body (26). Thus the cap (40) can be assembled with and removed from the body (26), as and when required.

The provision of the removable cap (40) provides a number of advantages. When the cap is assembled in position on the body (26) the safety device (24) provides both a nut position indicating function by means of the pointer (28) and the cap (40) prevents the ingress of foreign bodies into the nut and bolt assembly. It is a requirement at least in the United Kingdom that there should be at least three threads on the bolt (20) standing proud of the nut (22). Thus in order to inspect whether this requirement is being met, the cap (40) can be readily removed for such an inspection without having to remove the whole of the body (26) and the integral pointer (28) thereby avoiding the need to ensure that the pointer has to be correctly re-aligned with the reference point as would be the case if the cap (40) had been integral with the body (26).

Provision of the separate cap (40) also enables the cap to be moulded with indicia which for example can relate to the make of vehicle or the vehicle owner. Thus the cap can be moulded with the vehicle makers name or the vehicle owners name.

Figure 6:
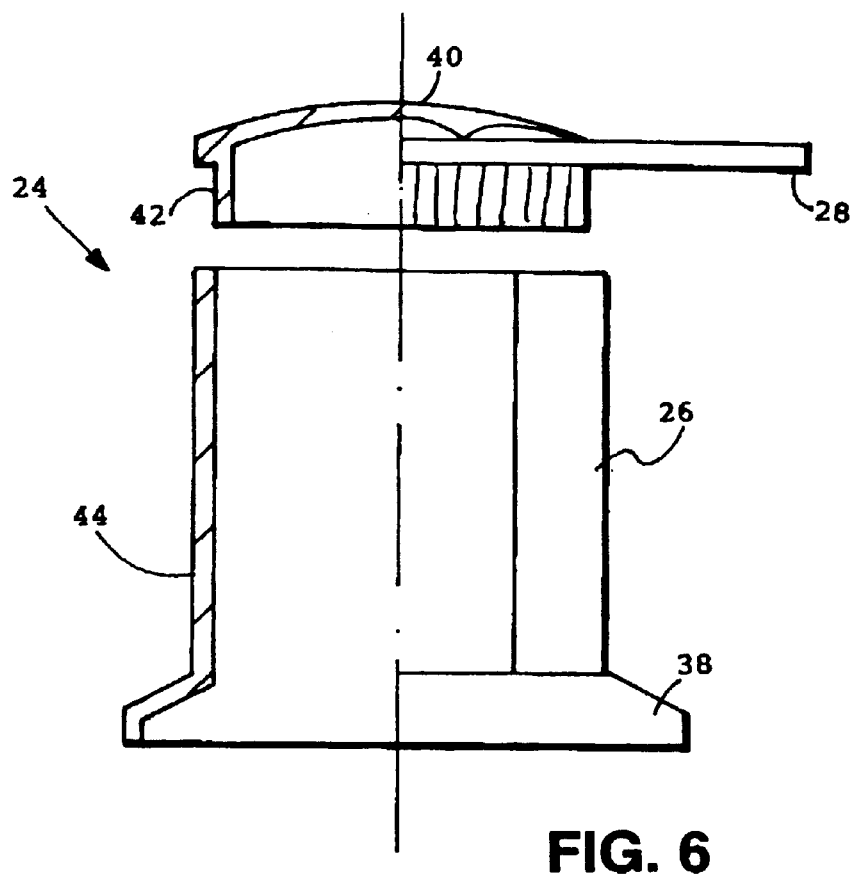
FIG. 6 shows a part sectional elevation of a modified form of safety device to that shown in FIGS. 4 and 5.

Referring to FIG. 6 the safety device (24) shown in this figure has an extended length body (26) of hexagonal section and a removable cap (40) incorporates the pointer (28) rather than the pointer being formed with the body (26).

The cap (40) is formed with splines or serrations (42) which engage with splines or serrations (44) which are formed internally of the length of the body (26).

Figure 7:
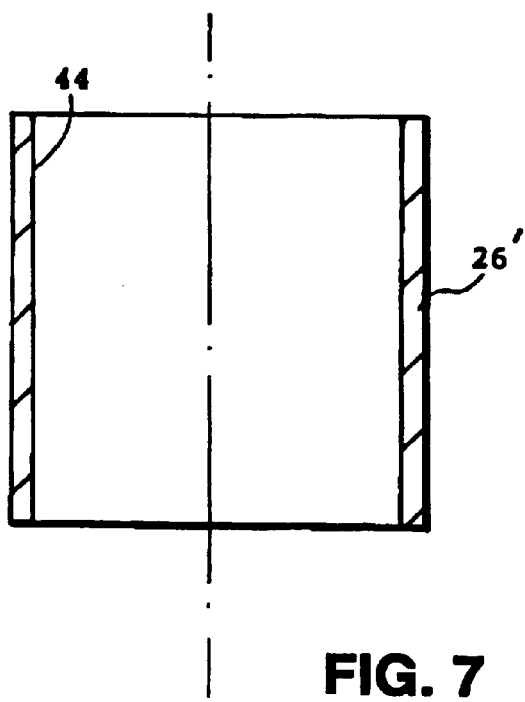
FIG. 7 shows a cross-section of an extension to one of the components of the safety device shown in FIG. 6.

In some situations a trim can be fitted to the vehicle wheel so as to cover the wheel bolts (20) and nuts (22). In such an arrangement it is necessary for the safety device of the present invention to extend through such a trim so that the position of the pointer (28) can be readily seen with respect of the reference point. The arrangement of safety device shown in FIG. 6 achieves this objective when an extension body (26) of circular section, and formed internally with splines or serrations (44), as shown in FIG. 7 is fitted between the body (26) and the cap (40).

Figure 8:
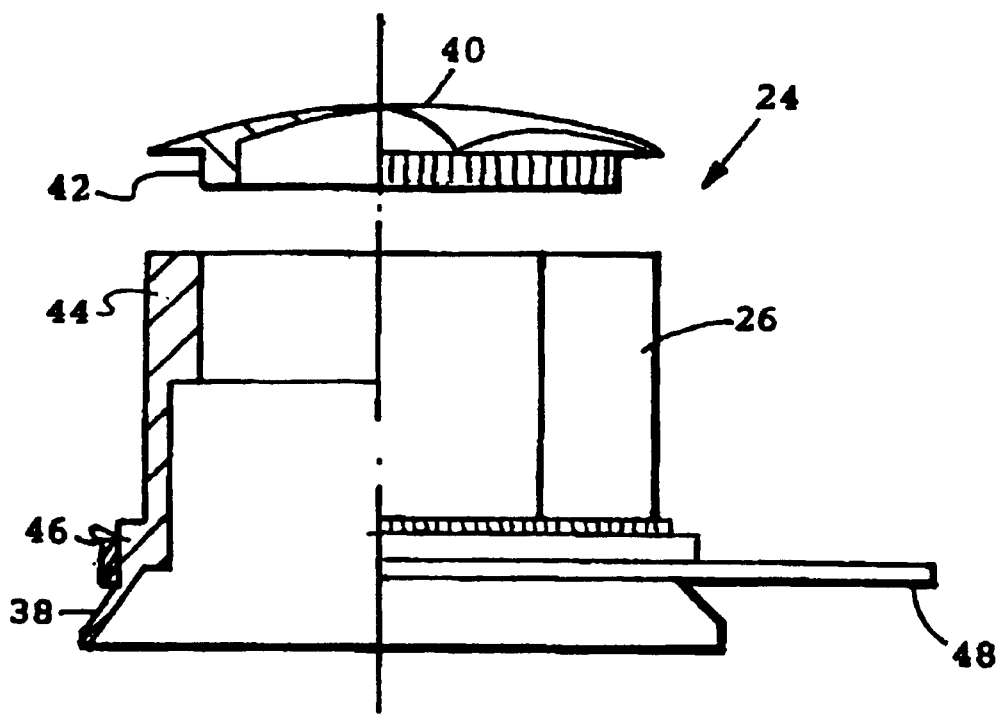
FIG. 8 shows a part sectional elevation of a further modified form of the safety device to that shown in FIGS. 2 and 3.

Referring to FIG. 8 the safety device (24) has an hexagonal body (26), a removable cap (40) having splines or serrations (42) which engage with splines or serrations (44) formed internally of the body (26), and the body (26) has a flared region (38).

The body (26) is also formed with an external ring of splines or serrations (46) upon which a removable pointer (48) is mounted. The pointer (48) has an internal ring of splines or serrations which engage with the splines or serrations (46).

Figure 9:
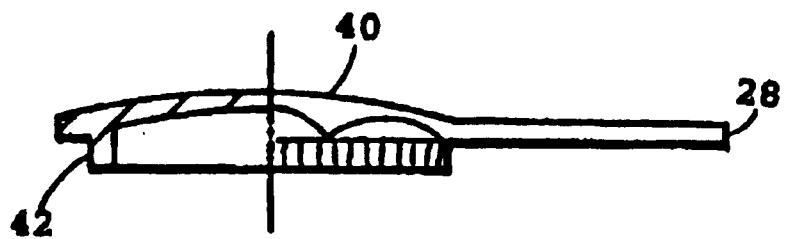
FIG. 9 shows a modified form of one of the components of the safety device shown in FIG. 8.

Referring to FIG. 9 the cap (40) can include the pointer (28) which is shown in FIG. 6 rather than the pointer being a separate component (48) which can be attached to the body (26) just above the flared region (38) if required.

Thus it will be seen that safety devices according to the present invention can be formed as one component or as two or three components which can be assembled together in a variety of arrangements to meet the requirements of the end user.

It will be appreciated that if there is any relative movement between any one of the nuts (22) and its stud (20) the pointer (28) will not be pointing towards its reference mark (32). Therefore the devices according to the present invention provide a visual indication if the nut to which it is attached, has become loose without the need to jack the vehicle wheel and to test each nut for tightness by hand or by using a tool.

Whilst in the illustrated embodiments of the invention all of the pointers are directed radially outwardly, they can be directed in any direction which may be appropriate. For example, all of the pointers can point in a number of random directions provided that when each device is attached to a tightened nut the pointer will be directed towards a reference mark so that displacement between the pointer and the reference mark can be visually noted.

Further, the pointers on adjacent nuts can point towards each other, so that the adjacent pointer becomes a reference mark. In such an arrangement, if both nuts loosen, they diverge from the reference mark (the opposite pointer) at a greater rate.

The mark (32) can be omitted, and the pointers can be directed in a common direction, e.g. all parallel to one another, or all radially outwardly or inwardly, so that if one or more of the wheel nuts became loose, the displacement of the safety devices is readily noted by the eye.

If it is required to tighten a wheel nut the device (24) can be removed from the nut by applying leverage between the device and the wheel rim or applying a pulling load to the devices (24) to remove the device from the nut. After tightening has taken place the device is replaced so that the indicator (28) is pointing towards the reference mark (32). If it is not possible when replacing the device for the pointer (28) to point directly to the reference point (32) the reference mark can be removed from its existing position and relocated so that the pointer (28) is directed towards it.

What is claimed:

1. A safety device for use with a reference to indicate relative rotational displacement between a first member and a second member which are relatively rotatably engaged with each other, the device comprising:
    a body having a bore formed with equispaced grooves enabling the device to be releasably secured to the second member in one of a plurality of positions and also having an integrally formed pointer that indicates the position of the device relative to the reference; and
    a cap which fits into or onto one end of the body to close off the bore, the cap being non-rotatably mounted into or onto one end of the body and being removable to allow inspection of or access to the engaged first and second members.

2. The device as claimed in claim 1, wherein the body is formed with an outwardly raised rim at an end of the bore remote from said one end into or onto which the cap fits, and the pointer is formed as an extension of this rim.

3. The device as claimed in claim 1, wherein the body has a flared region at or adjacent to an end of the bore.

4. The device as claimed in claim 1, wherein the first member comprises a threaded stud and the second member comprises a nut.

5. The device as claimed in claim 1, wherein at least one of the body or the cap is fluorescent.

6. A vehicle wheel and hub assembly, comprising:
    a wheel;
    a hub;
    multiple nuts that each define a hole;
    threaded studs that secure the wheel to the hub, the threaded studs extending through the holes in the wheel and nuts so as to clamp the wheel to the hub;
    a reference; and
    a safety indicating device being arranged on at least one of the multiple nuts, the safety indicating device including:

a body having a bore formed with equispaced grooves enabling the device to be releasably secured to the at least one nut in one of a plurality of positions and also having an integrally formed pointer that indicates the position of the device relative to the reference; and a cap which fits into or onto one end of the body to close off the bore, the cap being non-rotatably mounted into or onto one end of the body and being removable to allow inspection of or access to the engaged at least one nut and corresponding threaded stud.

7. A safety device for use with a reference to indicate relative rotational displacement between a first member and a second member which are relatively rotatably engaged with each other, the device comprising a body having a bore formed with equispaced grooves enabling the device to be releasably secured to the second member in one of a plurality of positions, the bore being closed at one end by a closure which is formed integrally with the body so as to serve as a dust cap for conjoined first and second members, the body also having an integrally formed laterally projecting pointer that indicates the position of the device relative to the reference.

8. The device as claimed in claim 7, wherein the integral pointer is formed as an extension of an outwardly raised rim at the open end of the bore.

9. The device as claimed in claim 7, wherein the body has a flared region at or adjacent to the open end of the bore.

10. The device as claimed in claim 7, wherein the first member comprises a threaded stud and the second member comprises a nut.

11. The device as claimed in claim 7, wherein the reference comprises a mark on a structure to be secured between the first and second members.

12. The device as claimed in claim 7, wherein the body is fluorescent.

13. A vehicle wheel and hub assembly, comprising:
a wheel defining holes;
a hub;
multiple nuts that each define a hole;
fixed threaded studs that secure the wheel to the hub, the fixed threaded studs extending through the holes in the wheel and nuts so as to clamp the wheel to the hub;
a reference; and
a safety indicating device arranged on at least one of the multiple nuts, the safety indicating device comprising a body having a bore formed with equispaced grooves enabling the device to be releasably secured to the at least one nut in one of a plurality of positions, the bore being closed at one end by a closure which is formed integrally with the body so as to serve as a dust cap for the conjoined at least one nut and corresponding threaded stud, the body also having an integrally formed laterally projecting pointer that indicates the position of the device relative to the reference.

14. A safety device for indicating relative rotational displacement between a first member and a second member which is rotatably engaged with the first member, the device comprising a body having a bore formed with equispaced grooves enabling the device to be releasably secured to the second member in one position of a plurality of positions, the body defining a bore that is closed at one end so that the body additionally serves as a dust cap for conjoined first and second members, the body having a flared region at or adjacent to the open end of the bore and also having an integrally formed laterally projecting pointer to indicate the position of the device relative to a reference.

* * * * *